(12) United States Patent
Khan et al.

(10) Patent No.: US 12,705,238 B2
(45) Date of Patent: Aug. 11, 2026

(54) RECORD SNAPSHOT

(71) Applicant: Salesforce, Inc., San Francisco, CA (US)

(72) Inventors: Minhaj Khan, New York, NY (US); Avanthika Ramesh, San Francisco, CA (US); Karen Yin, San Jose, CA (US); Jan Adriaan Kruger, Fuquay-Varina, NC (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/999,825

(22) Filed: Dec. 23, 2024

(65) Prior Publication Data

US 2026/0079933 A1 Mar. 19, 2026

Related U.S. Application Data

(60) Provisional application No. 63/695,211, filed on Sep. 16, 2024.

(51) Int. Cl.

| | |
|---|---|
| ***G06F 16/2453*** | (2019.01) |
| ***G06F 16/22*** | (2019.01) |
| ***G06F 16/248*** | (2019.01) |
| ***G06F 40/186*** | (2020.01) |
| ***G06Q 30/01*** | (2023.01) |

(52) U.S. Cl.

CPC .... *G06F 16/24534* (2019.01); *G06F 16/2246* (2019.01); *G06F 16/248* (2019.01); *G06F 40/186* (2020.01); *G06Q 30/01* (2013.01)

(58) Field of Classification Search

None

See application file for complete search history.

(56) References Cited

U.S. PATENT DOCUMENTS

| | | | | |
|---|---|---|---|---|
| 12,536,164 | B1 * | 1/2026 | Jang | G06F 16/245 |
| 12,536,387 | B2 * | 1/2026 | Sobhy Deraz | G06F 40/18 |
| 12,578,839 | B1 * | 3/2026 | Shah | G06F 3/04817 |
| 2021/0042662 | A1 * | 2/2021 | Pu | G06N 20/00 |
| 2024/0064161 | A1 * | 2/2024 | Liu | H04L 41/069 |
| 2025/0053685 | A1 * | 2/2025 | Hall | G06F 21/6254 |

(Continued)

OTHER PUBLICATIONS

An Interactive Query Generation Assistant using LLM based Prompt Modification and User Feedback (Year: 2023).*

(Continued)

*Primary Examiner* — Kim T Nguyen

(74) *Attorney, Agent, or Firm* — Sterne, Kessler, Goldstein & Fox P.L.L.C.

(57) ABSTRACT

Disclosed herein are system, method, and computer program product embodiments for implementing grounding of prompt templates using record snapshot. An embodiment operates by parsing a data record to generate a hierarchical tree graph of context data corresponding to a prompt template selected based on a type of a prompt request, and the data record is identified based on a data-record reference in the prompt request. The embodiment then generates a prompt from the prompt template by grounding the prompt template with a data object comprising the hierarchical tree graph of context data. The embodiment then queries a large language model with the prompt to generate an output specific to the data record.

20 Claims, 8 Drawing Sheets

(56) References Cited

U.S. PATENT DOCUMENTS

| | | | | |
|---|---|---|---|---|
| 2025/0094693 | A1* | 3/2025 | Ryskamp | G06F 16/332 |
| 2025/0278419 | A1* | 9/2025 | Mui | G06F 40/295 |
| 2025/0291854 | A1* | 9/2025 | Ho | G06F 16/93 |
| 2025/0348704 | A1* | 11/2025 | Liu | G06N 3/042 |
| 2026/0044495 | A1* | 2/2026 | Rughwani | G06F 16/243 |
| 2026/0064676 | A1* | 3/2026 | Upadhyay | G06F 16/24522 |
| 2026/0064781 | A1* | 3/2026 | Jia | G06F 16/93 |
| 2026/0065085 | A1* | 3/2026 | Narayanan | G06N 5/022 |
| 2026/0072902 | A1* | 3/2026 | Mathew | G06F 16/243 |
| 2026/0072905 | A1* | 3/2026 | Belanger | G06F 16/243 |

OTHER PUBLICATIONS

Prompting Is Programming: A Query Language for Large Language Models (Year: 2023).*

* cited by examiner

RECORD SNAPSHOT

CROSS-REFERENCE TO RELATED APPLICATIONS

This application claims benefit of U.S. Provisional Application No. 63/695,211, filed Sep. 16, 2024, entitled "AUTO-GROUNDING," the entire disclosure of which is incorporated herein by reference.

BACKGROUND

A prompt is a set of detailed instructions provided to an LLM. Effective prompt generation for LLMs involves crafting clear and specific inputs to guide the models in generating accurate and relevant outputs. Furthermore, providing context information within an LLM prompt is essential for generating accurate and relevant responses. Contextual information helps the model understand the background and nuances of the task, enabling it to produce outputs that are more aligned with the user's intent. Without adequate context, the model may generate generic or off-target responses, as it lacks the necessary information to fully grasp the specifics of the request.

The process of creating and iterating on a new prompt to generate a high-quality response can be time-consuming. Additionally, designing dozens of original prompts, each with different data and specifications, can be extremely complex. Also, prompts created by different people can produce inconsistent outputs due to variations in writing style. Furthermore, manually including context information in LLM prompts does not scale effectively, and can be time-consuming and prone to inconsistencies. Automated solutions and tools for context integration are needed to streamline prompt generation, ensuring that prompts are consistently well-crafted and contextually rich without requiring extensive manual input.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing grounding of prompt templates using record snapshot.

One or more implementations relate to the field of large language models (LLMs), and more specifically, to an improved prompt builder system for LLMs. A prompt for a language model is a text input or query crafted to trigger a specific response or action from the model. These prompts act as instructions or questions that steer the model in producing relevant outputs based on the provided context.

Creating and refining a new prompt to achieve a high-quality response can be a lengthy iterative process. Designing numerous original prompts, each with unique data and requirements, adds further complexity. Additionally, prompts created by different individuals may yield inconsistent outputs due to differences in writing styles. Manually adding context to prompts is not scalable, as it is both time-consuming and susceptible to inconsistencies. Automated tools for context integration are necessary to simplify prompt creation, ensuring that prompts are consistently well-designed and contextually appropriate without requiring extensive manual effort.

To address the above technical challenges, aspects herein describe a prompt builder system that utilizes configurable prompt templates to improve the efficiency and effectiveness of prompt generation for LLMs. A customizable prompt template includes placeholders for specific details about customers, products, and more. Customizable prompt templates enable users to enrich LLM prompts with custom data to provide context and to generate user-specific responses. Aspects herein describe using a record snapshot tool for embedding user specific and task-specific context information into prompt templates for efficiently generating custom LLM prompts.

Various embodiments of these features will now be discussed with respect to the corresponding figures.

Figure 1:
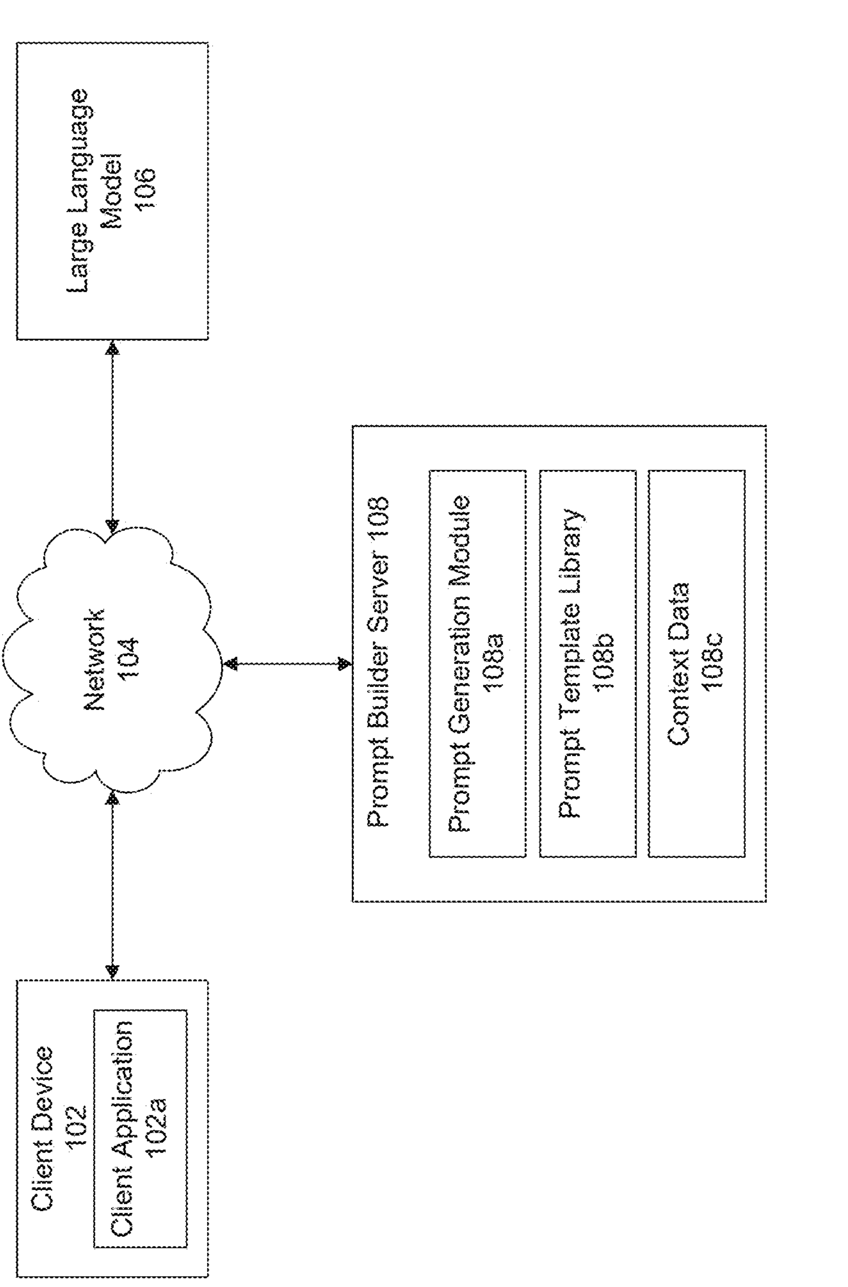
FIG. 1 illustrates a block diagram of an example prompt builder system for grounding LLM prompt templates using record snapshot, according to aspects of the present disclosure.

FIG. 1 illustrates a block diagram of an exemplary prompt builder system 100 for grounding LLM prompt templates using record snapshot, in accordance with some embodiments. As illustrated in FIG. 1, prompt builder system 100 includes client device 102, prompt builder server 108, and LLM 106. Client device 102, prompt builder server 108, and LLM 106 are configured to communicate with each other via network 104. Network 104 can be the Internet or a service provider network. Network 104 can include wireless links (e.g., cellular, satellite, Wi-fi, etc.), wired links (e.g., coaxial cable, Ethernet cable, fiber optic cable, etc.), and/or combinations thereof.

According to some aspects, client device 102 can be configured to communicate with prompt builder server 108 to generate a prompt for querying LLM 106. For example, client device 102 can initiate a prompt request to data server 108 to create and/or load a prompt template based on a use-case scenario. Prompt builder application 102*a* at client device 102 provides a user interface to enable customization and resolution of prompt templates.

Grounding is a process through which domain-specific knowledge and user information are added to a prompt to give the model the context it needs to respond more accurately. According to some aspects, grounding a prompt template with context information enables LLM 106 to create personalized responses based on the grounding information. According to some aspects, a prompt template can include several embedded merge fields, and context information can be added to the prompt template using the merge fields. A merge field is a placeholder in a document or template that can be replaced with specific data from a database, spreadsheet, or another data source. A user can specify a data resource (e.g., a customer relationship management (CRM) resource) to ground the prompt template using the UI of prompt builder application 102*a*, as discussed in further detail below.

According to some aspects, prompt builder server 108 of a prompt builder system includes prompt generation module 108*a*, prompt template library 108*b*, and context data database 108*c*. According to some aspects, prompt generation module 108*a* is configured to receive a customized prompt template from prompt builder application 102*a*. The prompt generation module 108*a* then performs a resolving operation on the prompt template using the grounding resources selected by a user. According to some aspects, prompt builder application 102*a* resolves the prompt template by replacing the merge fields in the prompt template with the corresponding context data from grounding resources (e.g., CRM resource) selected by a user.

Prompt template library 108*b* can consist of detailed prompts that represent a variety of use cases for different prompt template types. Prompt templates can be retrieved from prompt template library 108*b* for grounding with context data. According to some aspects, context data database 108*c* may include data store stored locally or in a data cloud by an enterprise or a user accessing the prompt builder system 100 or by external data sources that provide context data for grounding prompt templates of prompt template library 108*b*.

According to some aspects, a resolved prompt is obtained once prompt template is grounded with information corresponding to the merge fields. Prompt builder server 108 sends the resolved prompt to LLM 106 to generate a response.

According to some aspects, prompt builder system 100 can change the LLM configuration used to generate the response. According to some aspects, prompt builder system 100 can employ several LLM configurations, and a user can choose an LLM configuration as needed. According to some aspects, prompt builder system 100 can include standard OpenAI GPT LLM configurations and/or standard Azure OpenAI GPT LLM configurations, by way of non-limiting example. According to some aspects, each version of a prompt template of the prompt template library 108*b* can be mapped to a different LLM model configuration.

Figure 2:
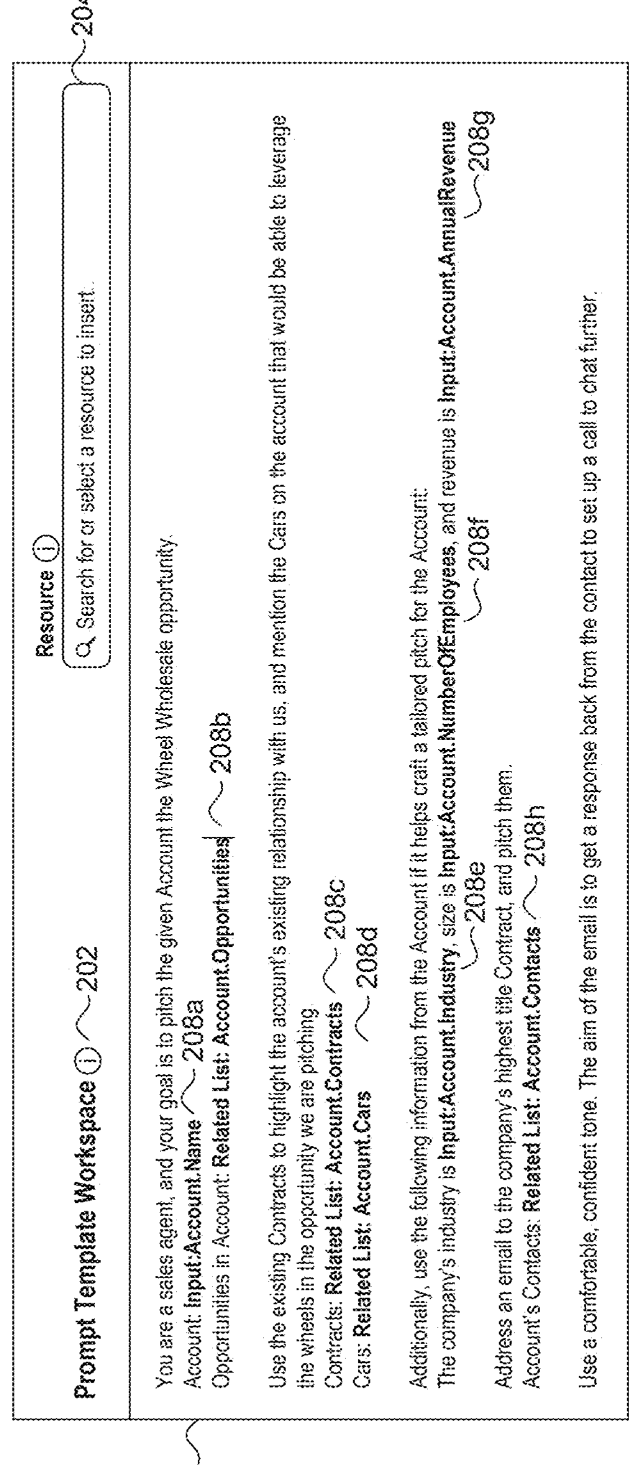
FIG. 2 illustrates an example user interface of a prompt builder application, according to aspects of the present disclosure.

FIG. 2 illustrates an exemplary user interface 200 of the prompt builder application, in accordance with some aspects of this disclosure. According to some aspects, user interface 200 can be accessed via client device 102. The prompt builder's user interface 200 includes a prompt template workspace 202. The prompt builder system utilizes configurable prompt templates to generate LLM prompts. Prompt template workspace 202 has a resource picker tool 204 and a workspace area 206 that displays the prompt template text. According to some aspects, resource picker tool 204 is used to select grounding data to ground the prompt template with.

According to some aspects, a prompt template can have multiple merge fields (e.g., 208*a*-208*h*) embedded in the text. Actual data that replaces the merge field in the template can be contained in a data resource (e.g., CRM resource). When the prompt template is resolved, the prompt builder system replaces the merge fields in the prompt template with the corresponding data from the data source for each record.

In the example of FIG. 2, area 206 of prompt template workspace 202 shows the text of an example prompt template for generating a sales pitch email. The template states: "You are a sales agent, and your goal is to pitch the given Account the Wheel Wholesale Opportunity. Use the existing Contracts to highlight the account's existing relationship with us, and mention the Cars on the account that would be able to leverage the wheels in the opportunity we are pitching . . . . The aim of the email is to get a response back from the contact to set up a call to chat further." The prompt template is embedded with merge fields 208*a*-208*h* to ground the context information corresponding to a data record (e.g., an account object corresponding to an account of a car dealership, case history corresponding to a case, etc.) into the prompt. According to some aspects, resource picker tool 204 can be used to include merge fields 208*a*-208*h* in the prompt template to ground the content information. According to some aspects, grounding the prompt template with context information corresponding to the account generates an LLM response tailored for a specific data record (e.g., an account object of a specific customer account).

In the example of FIG. 2, the merge field Input:Account.Name 208*a* corresponds to the name of the account object (e.g. Elk Grove Dealership) for grounding the prompt template. The merge field Related List: Account.Opportunities 208*b* can correspond to the list of business opportunities that are currently associate with the account object. The merge fields Related List: Account.Contracts 208*a* and Related List: Account.Cars 208*d* correspond to information related to the list of contracts and the list of cars associate with the account object. The merge fields Input:Account.Industry 208*e*, Input:Account.NumberOfEmployees 208*f*, Input:Account.AnnualRevenue 208*g*, and Related List: Account.Contacts 208*h* correspond to the type of industry the account object operates in, the number of employees, annual revenue, and the list of contacts corresponding to the account object (e.g. Elk Grove Dealership), respectively.

According to some aspects, various types of merge fields can be embedded in a prompt template workspace 202. According to some aspects, a prompt template can be grounded with merge fields that provide access to data cloud objects. By referencing data cloud objects, real-time information that was consolidated across multiple data sources can be added to the prompt template. According to some aspects, a merge field in a prompt template can be used to return data from a Salesforce Object Query Language (SOQL) query or to return data from an external API. According to some aspects, a prompt template can be grounded with data model objects (DMOs) from a data cloud via the prompt builder system.

According to some aspects, to add the merge field 208*a*-208*h*, a user (e.g., a prompt engineer) may have to manually click through the account and its data model, using the resource picket tool 204, many times to fetch the fields corresponding to the merge fields 208*a*-208*h*. Furthermore, the user may have to ascertain which field may contain the data they need to ground the prompt template with for the specific use case scenario (e.g., to generate a sales pitch email to an account).

According to some aspects, record snapshot can be employed to efficiently include grounding information in the prompt template. According to some aspects, record snapshot uses the prompt running user's page layout for the given data record (e.g., account object) and retrieves most of the fields and related lists from the page layout for grounding.

Figure 3:
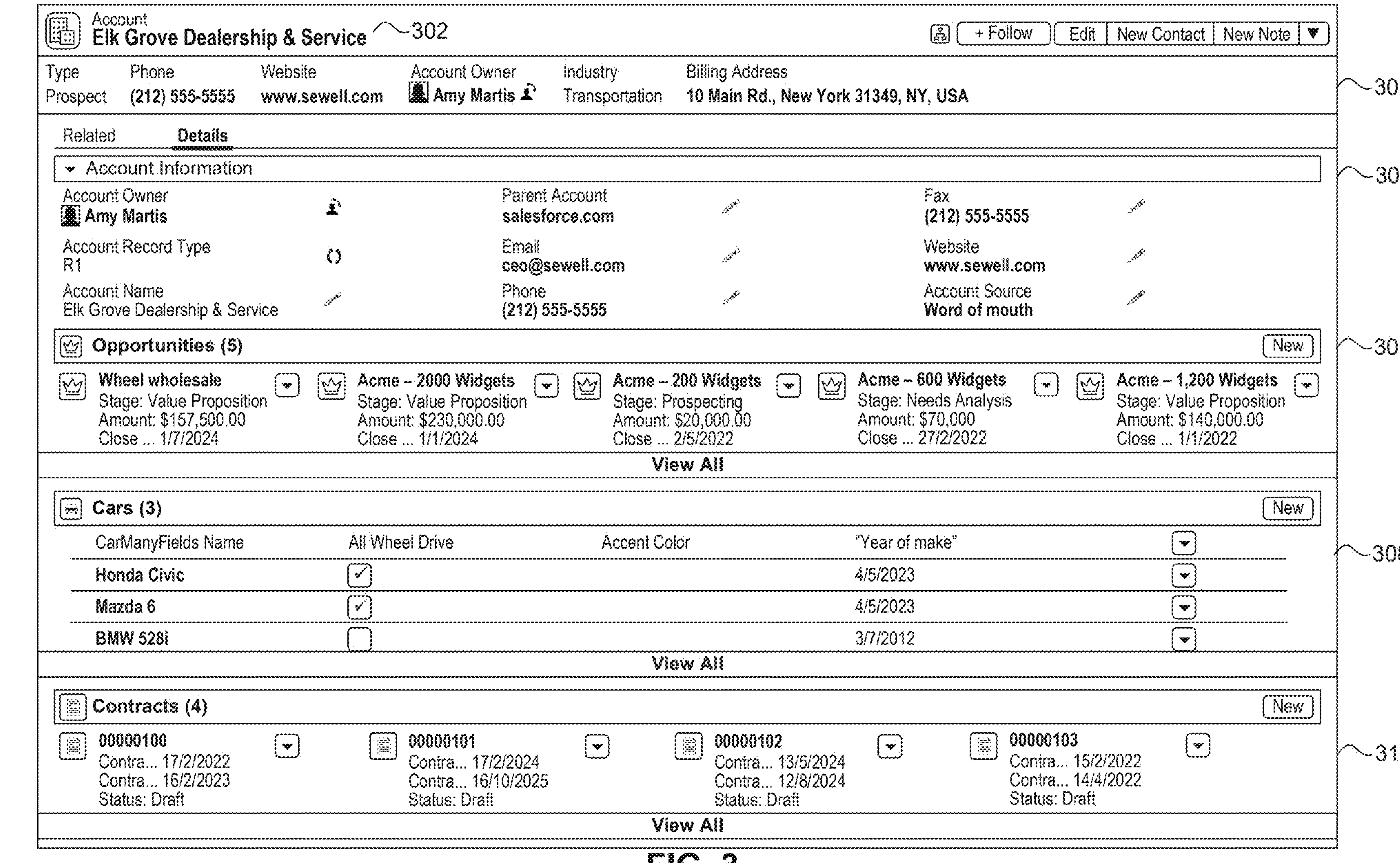
FIG. 3 illustrates a portion of an example page layout of a data record, according to aspects of the present disclosure.

FIG. 3 illustrates a portion of an exemplary page layout of a data record (e.g., an account object), according to some aspects of this disclosure. The user may select the account object using the user interface (e.g., an account selection tool 506 of FIG. 5) of the prompt builder system, and the prompt template can be grounded with specific information corresponding to the selected account object. In the example of FIG. 3, the example account object is an account corresponding to Elk Grove Dealership & Service 302. According to some aspects, page layouts correspond to the layout and organization of buttons, fields, s-controls, Visualforce, custom links, and related lists on account object record pages. According to some aspects, the page layout may indicate which fields are visible, read only, and required.

Page layout 300, illustrated in FIG. 3, shows general information 302 corresponding to the account. The exemplary general information 302 includes the following record fields: type of the account, the phone number, the website, the name of the account owner, industry, and billing address corresponding to the account Elk Grove Dealership & Service 302. The exemplary page layout portion 304 includes account information 304 and additional records fields such as account record type, parent account, and account source. The exemplary page layout portion 306 includes a list of opportunities 306 associated with the account. Record fields corresponding to each opportunity provide further information such as the identity of the opportunity, the current stage of the opportunity, the amount, and the associated close date.

The exemplary page layout portion 308 includes a list of cars 308 (e.g., Honda civic, Mazda 6, and BMW 528i) associated with the account. The layout includes record fields indicating whether each type of car includes all wheel drive and the year of make of each type of car. The exemplary page layout portion 310 includes a list of contracts 310 associated with the account and dates corresponding to the listed contracts.

According to some aspects, to ground the template with information corresponding to the selected account, a user (e.g., a prompt engineer) may have to manually click through the account and its data model many times to fetch the fields (e.g., record fields corresponding to 302-310) that correspond to the embedded merge fields 208*a*-208*h*. According to some aspects, record snapshot can be employed to efficiently include grounding information in the prompt template. According to some aspects, record snapshot uses the prompt running user's page layout (e.g., the page layout of account for the given account object) and retrieves most of the fields and related lists from the page layout for grounding.

Figure 4:
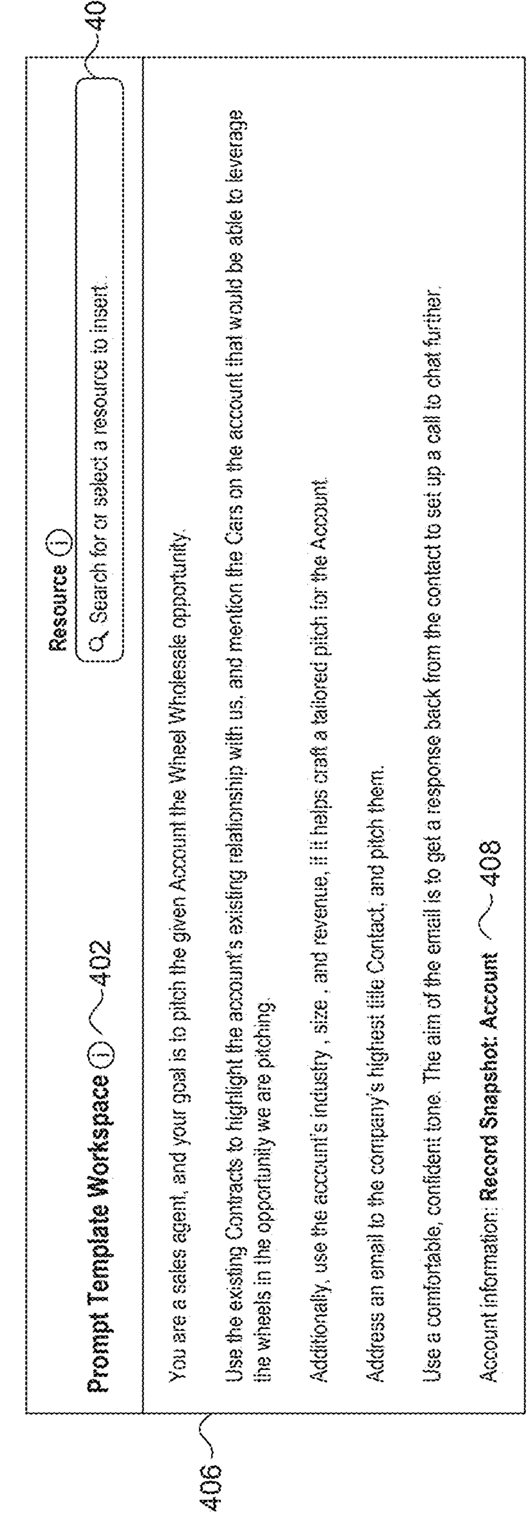
FIG. 4 illustrates an example prompt builder user interface with a prompt template using record snapshot, according to aspects of the present disclosure.

FIG. 4 illustrates an exemplary user interface 400 with a prompt template using record snapshot, in accordance with some aspects of this disclosure. According to some aspects, user interface 400 can be accessed via client device 102. According to some aspects, the example user interface 400 comprises a prompt template workspace 402 and a prompt review area. Prompt template work space 402 has a resource picker tool 404 and a workspace area 406 that displays the prompt template text. According to some aspects, resource picker tool 404 is used to select grounding data to ground the prompt template with.

In the example of FIG. 4, area 406 of prompt template workspace 402 shows the text of an example prompt template for generating a sales pitch email. The template states: "You are a sales agent, and your goal is to pitch the given Account the Wheel Wholesale Opportunity. Use the existing Contracts to highlight the account's existing relationship with us, and mention the Cars on the account that would be able to leverage the wheels in the opportunity we are pitching . . . . The aim of the email is to get a response back from the contact to set up a call to chat further." However, the prompt template does not include multiple individual merge fields embedded in the text. Instead, using the record snapshot tool, all the relevant customer data is embedded into the prompt template as a single resource. According to some aspects, the prompt template is embedded with a single merge field, Account information: Record Snapshot: Account 408. The single merge field grounds the account information from the data source as a hierarchical tree graph.

According to some aspects, various types of merge fields can be embedded in a prompt template. According to some aspects, record snapshot can ground a prompt template by automatically including data available on the user's page layout for an object with one resource. Instead of individually selecting multiple fields and related lists for an object, relevant data for grounding can be included in a single merge field. According to some aspects, the data that record snapshot uses to ground a prompt template depends on the page layout of the user. However, page layouts are configurable, and the configuration may impact which data is used by record snapshot. According to some aspects, when a prompt is resolved, the data in the resolved prompt reflects the user-visible data.

According to some aspects, the prompt builder application performing grounding using record snapshot extracts information about the elements of the page layout for the given data record (e.g., account object), retrieves most of the fields and related lists from the page layout for grounding, and creates a hierarchical tree graph object representing the contents of the layout. According to some aspects, tree graph object has a structured format that organizes data in a parent-child relationship and resembles a tree, such as a JavaScript Object Notation (JSON) object. For example, in a JSON object, the root could be an entire dataset, with child nodes representing categories, and further children detailing specific items within those categories. According to some aspect, when the prompt template is resolved, the prompt builder system replaces the merge field Record Snapshot: Account 408 with the hierarchical tree graph of context data corresponding to the page layout of the account object.

Figure 5:
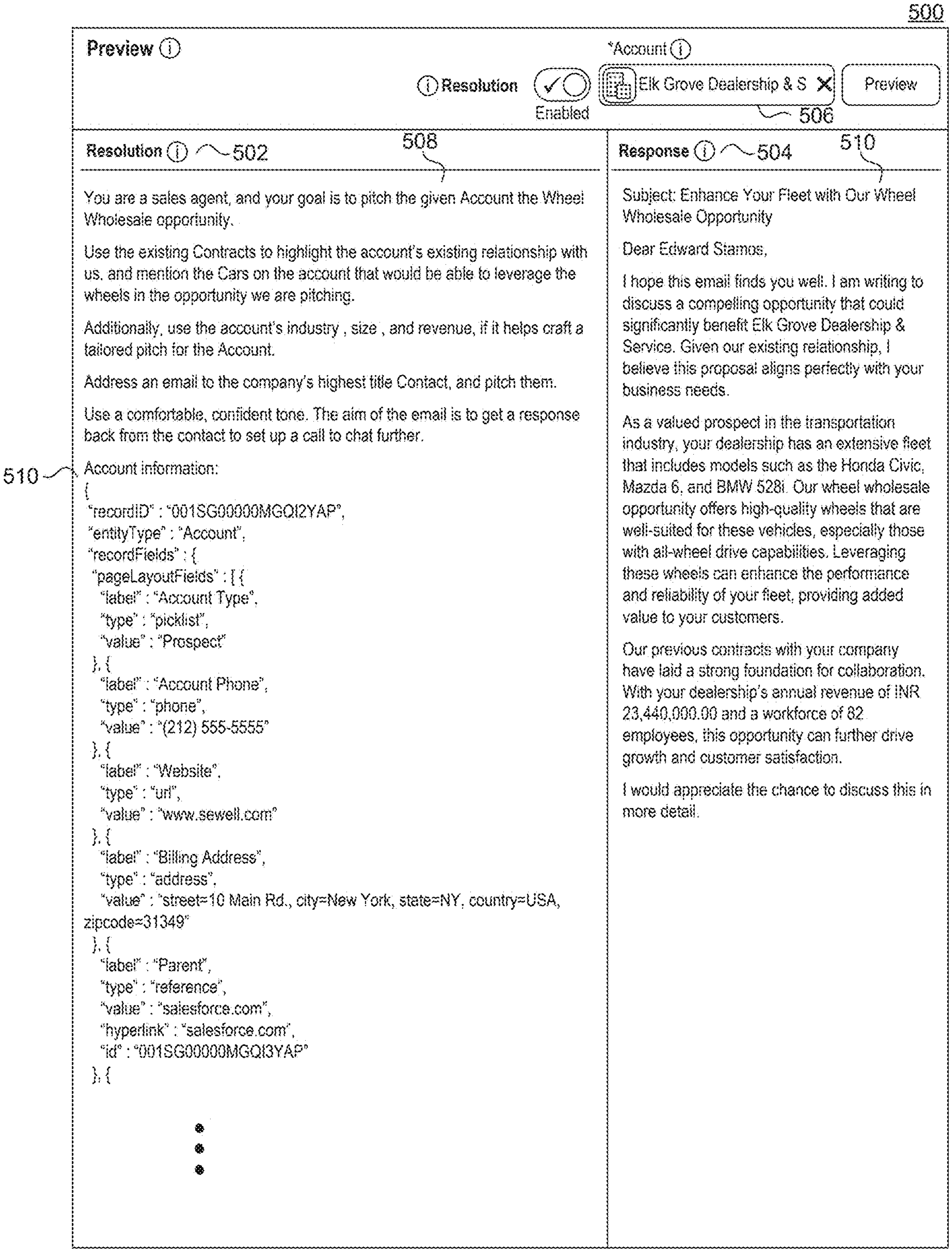
FIG. 5 illustrates an example preview area of the prompt builder user interface, according to aspects of the present disclosure.

FIG. 5 illustrates an exemplary preview area 500 of a user interface of the prompt builder application, in accordance with some aspects of this disclosure. According to some aspects, the preview area 500 includes a selection tool 506 for selecting an account object (e.g., Elk Grove Dealership) for grounding the prompt template. In the example of FIG. 5, the preview area 500 includes a resolution area 502 and a response area 504.

According to some aspects, the resolution area 502 displays the resolved prompt 508 corresponding to grounding of prompt template 406 using record snapshot illustrated in FIG. 4. The resolved prompt 508 includes the text of the example prompt template 406 followed by a tree graph (e.g., JSON object) of context data 510 corresponding to the page layout of the account object (e.g., page layout corresponding CRM data). According to some aspects, the prompt creates a hierarchical tree graph object (e.g., a JavaScript Object Notation (JSON) object) representing the contents of the layout.

An exemplary tree graph object 510 is illustrated in FIG. 5. According to some aspects, the record snapshot feature parses the data record (e.g., the CRM page of account object:

Elk Grove Dealership) to generate a tree graph of context data. According to some aspects, the resolved prompt 508 includes a portion of the tree graph corresponding to page layout 300 of an account object Elk Grove Dealership, illustrated in FIG. 3. According to some aspects, prompt builder application using record snapshot extracts information about the elements of the page layout 300 of the account Elk Grove Dealership account object and retrieves most of the fields and related lists from the page layout for grounding and creates hierarchical tree graph 510 representing the contents of the layout. According to some aspects, the tree graph 510 can be JSON object.

According to some aspects, a portion of the generated tree graph 510 shown in the resolved prompt 508 corresponds to general information 302 of page layout 300 of the Elk Grove Dealership object account. The record snapshot tool parses the page layout of the Elk Grove Dealership object account, retrieves the record fields on the page layout to generate the tree graph 510. For example, the account information portion 510 in the tree graph 510 corresponds to general information 302 and includes the following record fields: type of the account, the phone number, website, name of the account owner, industry, and billing address corresponding to the account Elk Grove Dealership & Service 304.

According to some aspects, LLM 106 may be queried using resolved prompt 508. The response area 504 illustrates an exemplary response 510 (e.g., sales pitch email) generated by LLM 106 in response to the input resolved prompt 508. According to some aspects, LLM 106 used the prompt text and the specific values of the record fields in the tree graph 510 to generate the sales pitch email shown in the response area 504. According to some aspects, response 510 can be evaluated for criteria such as factual accuracy, consistency, relevance, and the ability to mask confidential or sensitive information corresponding to the account. If response 510 does not meet the expected criteria, the prompt template can be revised, or the prompt template can be grounded with additional context information.

Figure 6:
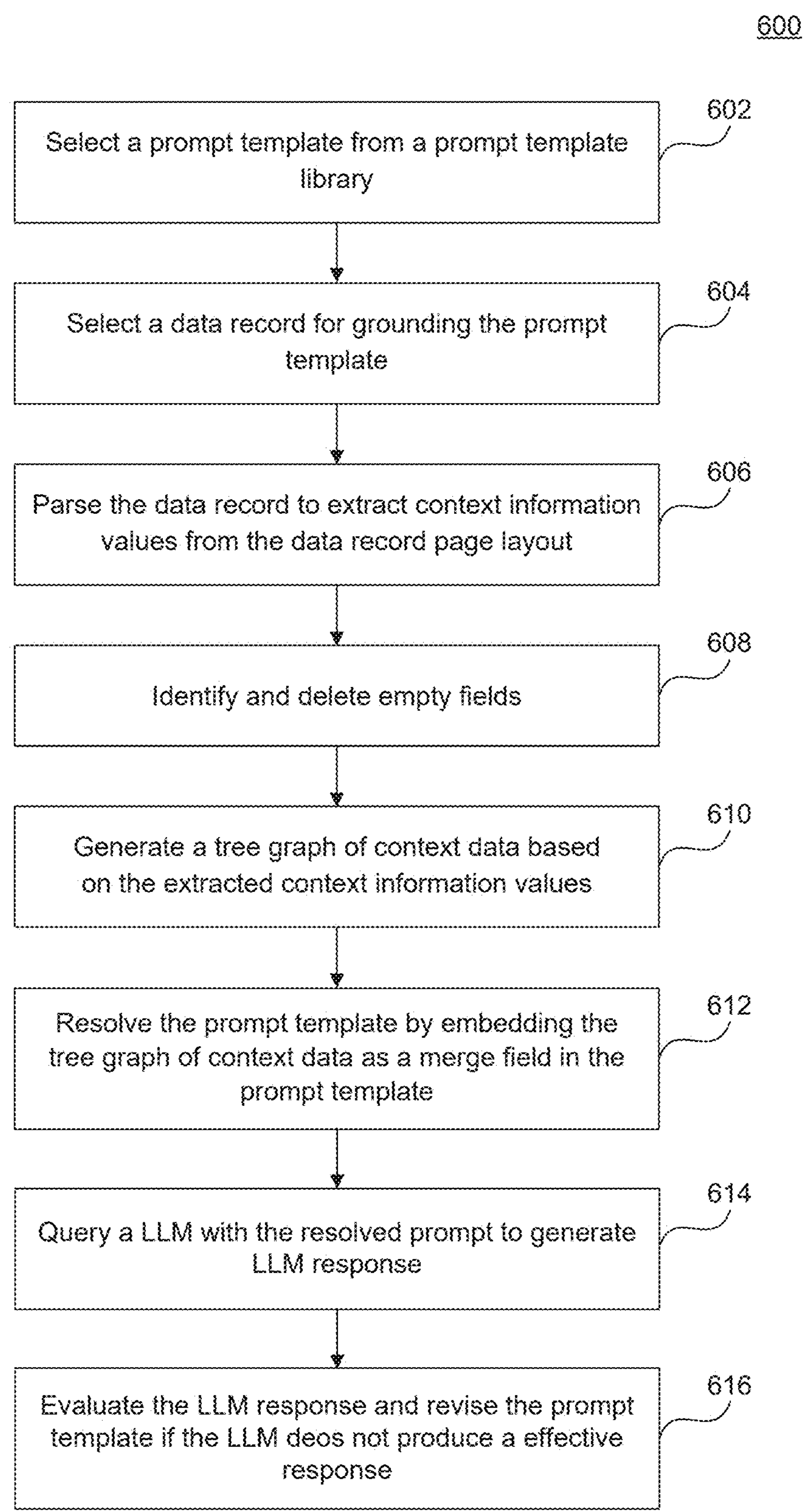
FIG. 6 illustrates a flowchart for implementing grounding of prompt templates using record snapshot, according to aspects of the present disclosure.

FIG. 6 is a flowchart for method 600 for implementing grounding of prompt templates using record snapshot, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 6, as will be understood by a person of ordinary skill in the art.

Method 600 shall be described with reference to FIGS. 1-5. However, method 600 is not limited to those example embodiments.

At 602, a prompt template is selected from a prompt template library. According to some aspects, a user generates a prompt request to return a type of prompt template in the prompter builder system. Prompt template library 108*b* can consist of detailed prompts that represent a variety of use cases for different prompt template types. According to some aspects, a prompt template is selected from prompt template library 108*b* based on the type of prompt request generated by a user. As an example, the type of prompt request can be a request to generate a sales pitch email prompt template or a record summary prompt template.

At 604, a data record for grounding the prompt template is selected. According to some aspects, the user may select a data record (e.g., an account object) using the user interface of the prompt builder system, and the prompt template can be grounded with specific information corresponding to the selected data record. According to some aspects, the data record for grounding is CRM data.

At 606, the page layout of the data record is parsed to extract context information values from the data record page layout. According to some aspects, record snapshot uses the page layout (e.g., page layout of a CRM page) of the selected data record and retrieves most of the fields and related lists from the page layout for grounding. According to some aspects, page layouts correspond to the layout and organization of buttons, fields, s-controls, Visualforce, custom links, and related lists on account object record pages.

At 608, the record snapshot tool identifies and deletes empty fields in the extracted context information. According to some aspects, record fields without values, sections without limits filters them out from the context information.

At 610, generate a hierarchical tree graph of context data based on the extracted context information values. According to some aspects, the prompt builder application using record snapshot uses the context information extracted from page layout data record creates a hierarchical tree graph object (e.g., a JavaScript Object Notation (JSON) object) representing the contents of the data record's page layout.

At 612, the prompt template is resolved by embedding the hierarchical tree graph of context data as a merge field in the prompt template. According to some aspects, using the record snapshot tool, all the relevant customer data is embedded into the prompt template as a single resource. According to some aspects, the prompt template is embedded with a single merge field. The single merge field grounds the account information from the data source as a tree graph. According to some aspect, when the prompt template is resolved, the prompt builder system replaces the single merge field with the tree graph of context data corresponding to the page layout of the data record.

At 614, an LLM is queried with the resolved prompt to generate LLM response. As an example, LLM 106 uses a prompt template for generating a sales pitch email grounded with a tree graph of specific values corresponding to an object account to generate a sales pitch email tailored to the specific account object.

At 616, the LLM response is evaluated and the prompt template is revised if the LLM does not produce an effective response. According to some aspects, the LLM response can be evaluated for criteria such as factual accuracy, consistency, relevance, and the ability to mask confidential or sensitive information corresponding to the account. If the LLM response does not meet the expected criteria, the prompt template may be revised, or the prompt template may be further grounded with additional context information.

Figure 7:
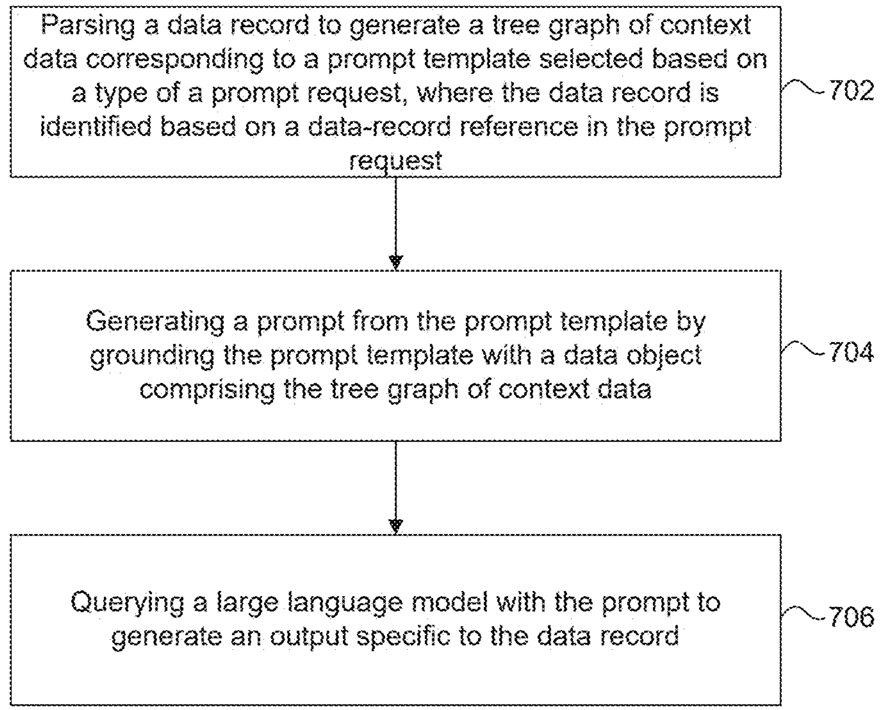
FIG. 7 illustrates another flowchart for implementing grounding of prompt templates using record snapshot, according to aspects of the present disclosure.

FIG. 7 is a flowchart for method 700 for implementing grounding of prompt templates record snapshot, according to an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 7, as will be understood by a person of ordinary skill in the art.

Method 700 shall be described with reference to FIGS. 1-5. However, method 700 is not limited to those example embodiments.

At 702, a data record is parsed to generate a tree graph of context data corresponding to a prompt template selected based on a type of prompt request. According to some aspects, a user generates a prompt request to create and/or load a type of prompt template in the prompter builder system. The type of prompt request generated by a user can depend on the use case being implemented. According to some aspects, a prompt template is selected from prompt template library 108*b* based on the type of prompt request. As an example, the type of prompt request can be a request to generate a sales email prompt template or to a record summary prompt template.

The selected prompt template can be edited and revised using prompt template workspace 202. A user can specify a data record to ground the selected prompt template. The data record can be selected by the user using resource picker 202*b*. According to some aspects, the data record is identified based on a data-record reference in the prompt template.

According to some aspects, identifying the data record can include matching a characteristic of the data record to the data record reference in the prompt request. As an example, the type of the prompt request can be a request to generate a type of email based on the data record. According to some aspects, parsing the data record to generate a tree graph of context data includes extracting a plurality of fields of the data record based on a page layout of the data record, and generating, based on the extracted plurality of fields, the hierarchical tree graph of context data corresponding to the page layout of the data record.

At 704, a prompt is generated from the prompt template by grounding the prompt template with a data object comprising the hierarchical tree graph of context data. According to some aspects, generating the prompt from the prompt template can include resolving a plurality of merge fields of the prompt template using the data object. According to some aspects, the data object is a JavaScript object notation (JSON) object.

According to some aspects, for grounding prompt templates using record snapshot, a prompt builder system can determine whether grounding data received from a data object exceeds a prompt token limit. The prompt builder system can restrict the amount of grounding data received from a data resource if it exceeds the prompt token limit.

According to some aspects, if Dynamic Forms are activated for an object used by the record snapshot tool, the underlying page layout is still used. According to some aspects, to perform grounding of a prompt template using record snapshot, the empty data fields (e.g., fields without values, sections without limits) are filtered out.

At 706, an LLM is queried with the prompt to generate an output specific to the data record.

Figure 8:
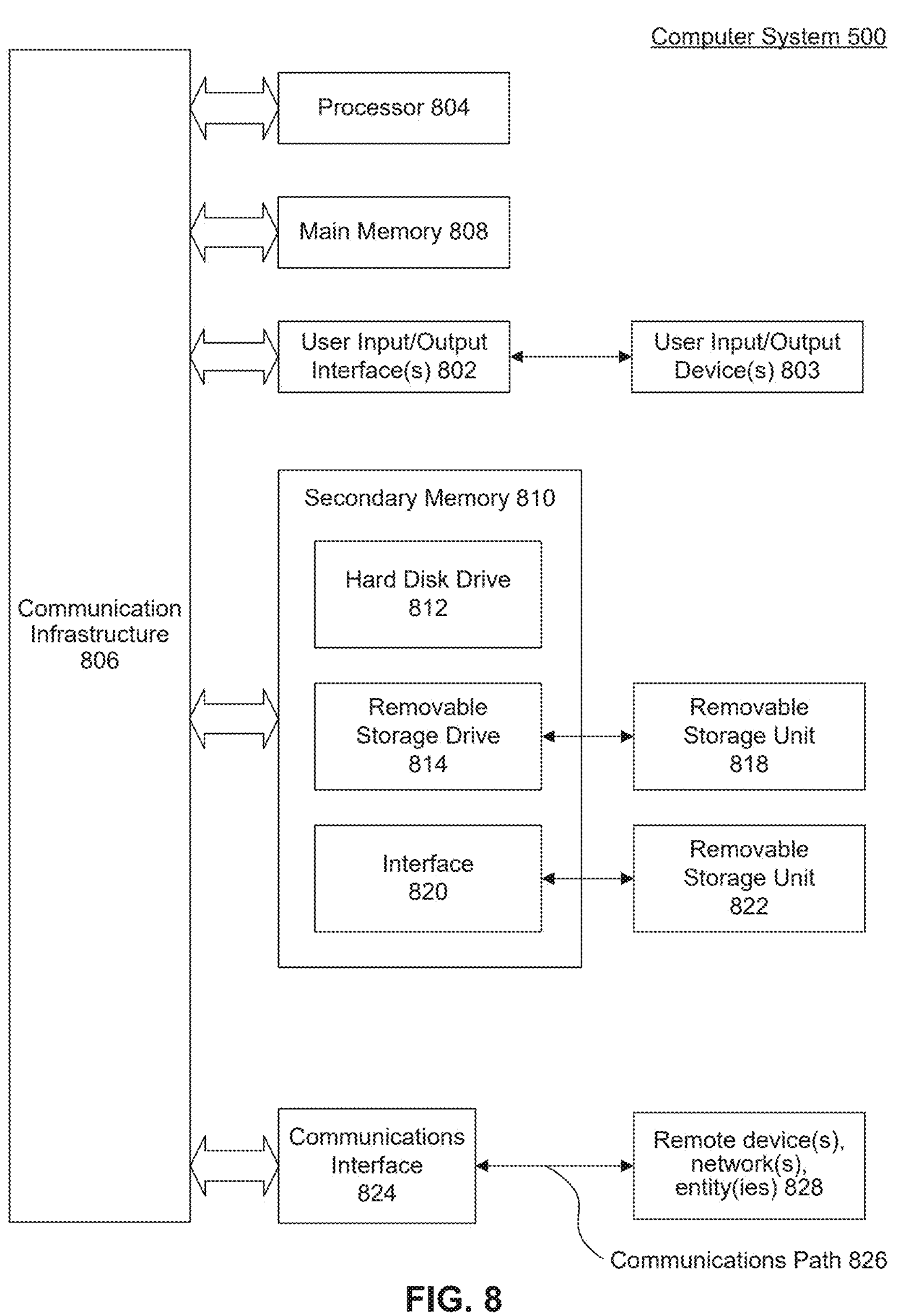
FIG. 8 depicts an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

parsing a data record responsive to a selection of the data record by a user, by at least one computer processor, into a plurality of data fields;

generating, by the at least one computer processor, a hierarchical tree graph of context data based on the plurality of data fields and corresponding to a prompt template selected based on a type of a prompt request, wherein the data record is identified based on a data-record reference in the prompt request;

generating a prompt from the prompt template by grounding the prompt template with a data object comprising the hierarchical tree graph of context data, the grounding including entering data from the data record into corresponding fields of the prompt template; and querying a large language model with the prompt to generate an output specific to the data record.

2. The method of claim 1, wherein parsing the data record to generate the hierarchical tree graph of context data comprises:

extracting a plurality of fields of the data record based on a page layout of the data record; and generating, based on the extracted plurality of fields, the hierarchical tree graph of context data corresponding to the page layout of the data record.

3. The method of claim 1, wherein identifying the data record comprises:

matching a characteristic of the data record to the data-record reference in the prompt request.

4. The method of claim 1, wherein generating the prompt from the prompt template comprises:

resolving a plurality of merge fields of the prompt template using the data object.

5. The method of claim 1, wherein the prompt template is grounded by embedding the data object within the prompt template in a single merge field.

6. The method of claim 1, wherein the data record is customer relationship management data.

7. The method of claim 1, wherein the type of the prompt request is a request to generate a type of email based on the data record.

8. The method of claim 1, wherein the data object is a JavaScript object notation (JSON) object.

9. A system, comprising:

a memory; and at least one processor coupled to the memory and configured to perform operations comprising:

parsing a data record responsive to a selection of the data record by a user into a plurality of data fields;

generating a hierarchical tree graph of context data based on the plurality of data fields and corresponding to a prompt template selected based on a type of a prompt request, wherein the data record is identified based on a data-record reference in the prompt request, generating a prompt from the prompt template by grounding the prompt template with a data object comprising the hierarchical tree graph of context data, the grounding including entering data from the data record into corresponding fields of the prompt template; and querying a large language model with the prompt to generate an output specific to the data record.

10. The system of claim 9, wherein to parse the data record to generate the hierarchical tree graph of context data, the operations further comprise:

extracting a plurality of fields of the data record based on a page layout of the data record; and generating, based on the extracted plurality of fields, the hierarchical tree graph of context data corresponding to the page layout of the data record.

11. The system of claim 9, to the operations further comprising:

matching a characteristic of the data record to the data-record reference in the prompt request.

12. The system of claim 9, wherein to generate the prompt from the prompt template, the operations further comprising:

resolving a plurality of merge fields of the prompt template using the data object.

13. The system of claim 9, wherein the prompt template is grounded by embedding the data object within the prompt template in a single merge field.

14. The system of claim 9, wherein the data record is customer relationship management data.

15. A non-transitory computer-readable medium (CRM) having instructions stored thereon that, when executed by at least one computing device, causes the at least one computing device to perform operations comprising:

parsing a data record responsive to a selection of the data record by a user into a plurality of data fields;

generating a hierarchical tree graph of context data based on the plurality of data fields and corresponding to a prompt template selected based on a type of a prompt request, wherein the data record is identified based on a data-record reference in the prompt request;

generating a prompt from the prompt template by grounding the prompt template with a data object comprising the hierarchical tree graph of context data, the grounding including entering data from the data record into corresponding fields of the prompt template; and querying a large language model with the prompt to generate an output specific to the data record.

16. The non-transitory CRM of claim 15, wherein parsing the data record to generate the hierarchical tree graph of context data comprises:

extracting a plurality of fields of the data record based on a page layout of the data record; and generating, based on the extracted plurality of fields, the hierarchical tree graph of context data corresponding to the page layout of the data record.

17. The non-transitory CRM of claim 15, wherein identifying the data record comprises:

matching a characteristic of the data record to the data record reference in the prompt request.

18. The non-transitory CRM of claim 15, wherein generating the prompt from the prompt template comprises:

resolving a plurality of merge fields of the prompt template using the data object.

19. The non-transitory CRM of claim 15, wherein the prompt template is grounded by embedding the data object within the prompt template in a single merge field.

20. The non-transitory CRM of claim 15, wherein the data record is customer relationship management data.

* * * * *